United States Patent [19]

Schwartz

[11] Patent Number: 4,856,055

[45] Date of Patent: Aug. 8, 1989

[54] CONTROLLABLE TELEPHONE ANNUNCIATOR

[76] Inventor: Nira Schwartz, 1225-376 Vienna Dr., Sunnyvale, Calif. 94089

[21] Appl. No.: 224,070

[22] Filed: Jul. 25, 1988

[51] Int. Cl.$^4$ .................................................. H04M 11/02
[52] U.S. Cl. .................................... 379/374; 379/386; 379/387
[58] Field of Search ............... 379/374, 373, 375, 387, 379/386

[56] References Cited

U.S. PATENT DOCUMENTS

| | | | |
|---|---|---|---|
| 4,480,153 | 10/1984 | Festa | 379/374 |
| 4,727,572 | 2/1988 | Whitney | 379/374 |

FOREIGN PATENT DOCUMENTS 0163554  8/1985  Japan ................................... 379/374

OTHER PUBLICATIONS

U.S. Statutory Invention Registration, Reg. No. H118, Biggs et al., 9-2-86.

*Primary Examiner*—James L. Dwyer
*Attorney, Agent, or Firm*—David Pressman

[57] ABSTRACT

A circuit is connected to the line of a telephone for disabling the ringer (22) of the telephone and supplying, instead of the regular ring signal, any of a plurality of predetermined alternative signal melodies or voice messages. The circuit comprises a ring detector (24) for detecting the incoming rings, a relay (26) which is responsive to the rings for turning off the regular ringer, a signal library (28) for storing the predetermined alternative signals, and an amplifier (32) and a speaker (34) for reproducing the signals in an audible manner. Also a current detector (30) is provided to detect direct current flow when the telephone is answered and thereupon disable the alternative signal source. The alternative signal may be selected by the telephone user with a switch on the signal library, or by supplying predetermined tones to the circuit, either by the caller or the called party (FIG. 4). If by a caller, the caller would use the dual-tone dialing tones to select the alternative signal just after the connection is made and preferably before ringing started. The circuit contains a DTMF (dual-tone, multi-frequency) detector (36) to produce binary output codes in response to the DTMF tones, and a selection logic circuit (38) would be provided to select the signal in the signal library. The system can be alternatively implemented by means of a programmed microprocessor (FIG. 6).

17 Claims, 5 Drawing Sheets

CONTROLLABLE TELEPHONE ANNUNCIATOR

BACKGROUND

1. Field of Invention

This invention relates generally to telephones, specifically to a telephone annunciator which produces special effects.

2. Description of Prior Art

Heretofore when a telephone call was made by a caller to a called party, the called party's phone usually announced the call by means of an internal annunciator. The annunciator was usually a pair of bells of two different sizes which were mechanically and alternately struck by a clapper to as to provide a series of jangling rings. Such a ringer, while effective to communicate an incoming call, was prosaic and ineffective for any other purpose but to announce the call. Also it sounded unpleasant and was jarring to the called party. Further, the calling party had no control over the annunciator's sound, other than its volume.

Some newer phones have substituted a chime for the unpleasant ringer. However these also provided a relatively prosaic sound and did not give the calling party any control over the chime's sound.

OBJECTS AND ADVANTAGES

Accordingly, one object and advantage of the invention is to provide an improved telephone annunciator. Other objects and advantages are to provide such an annunciator which provides a sound which is out-of-the-ordinary, which is pleasant and non-jarring, and which can be controlled by the calling party. Further objects and advantages are to provide an annunciator which can provide amusement, novel effects, or a message. Additional objects and advantages will become apparent from a consideration of the ensuing description and the accompanying drawings.

DRAWING FIGURES

Figure 1A:
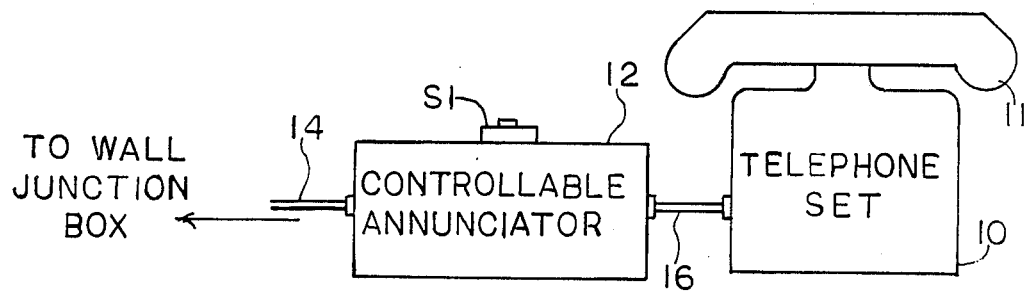
FIG. 1A is a diagram of a telephone set and a controllable annunciator (CA) according to the invention installed adjacent the set.

| | |
|---|---|
| 10 telephone | 11 handset |
| 12 controllable annunciator | 13 line cord |
| 16 interconnection cord | 18 wall junction box |
| 20 dial & speech circuits | 22 ringer |
| 24 ring detector | 26 relay |
| 27 inverter | 28 signal library |
| 30 current detector | 32 amplifier |
| 34 speaker | 36 DTMF detector |
| 38 selection logic circuit | 40 power supply |
| 42 plug | 44 decoder |

-continued

Drawing Reference Numerals:

| | |
|---|---|
| 46 oscillator | 48 counter |
| 50 microprocessor | 52 data bus |
| 54 microprocessor chip | 56 clock oscillator |
| 58 program ROM | 60 RAM library |
| 62 output D/A converter | 64 decoder |
| 66 remote input D/A converter | C1 capacitor in series with 30 |
| C2 ringer capacitor | C3 charging capacitor in 30 |
| C4 capacitor in series with 36 | L1, L2 phone input lines |
| L1A, L2 main phone lines | S1 momentary pushbutton switch |
| S2 handset switch | |

DETAILED DESCRIPTION

FIGS. 1A AND 1B

As shown in FIG. 1A, a conventional telephone 10 has a handset 11 and and internal ringer (not shown) which usually consists of a plurality of different-size bells which are alternately struck by a magnetically-driven clapper when an incoming call is received. This ringer produces an unpleasant, jangling, prosaic, and minimally-communicative sound.

In accordance with the invention, a controllable annunciator (CA) 12 is connected to the regular line cord 14 of telephone 10, in series with phone 10. CA 12 comprises a housing which may have the rectangular shape shown, or any other suitable shape. CA 12 is installed in series with phone 10 by unplugging line cord 14 from its regular modular socket or receptacle on the left side of phone 10 and plugging line cord 14 into a modular socket on the left side of CA 12. Then a short interconnection cord 16 is plugged into the receptacle and another receptacle on the right side of CA 12. Thus CA 12 will sit alongside phone 10 on a desk, table, or the like. As indicated, the other end of line cord 14 leads to a conventional wall- or baseboard-mounted junction box (similar to that shown at 18 in FIG. 2) where it is connected to the phone line.

Figure 1B:
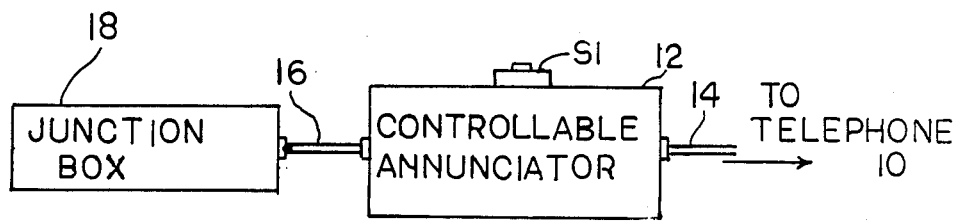
FIG. 1B shows the CA installed adjacent a wall junction box for the set.

As shown in FIG. 1B, in lieu of connecting CA 12 close to phone 10, it may be connected close to and mounted on a baseboard alongside wall junction box 18. In this case, interconnection cord 16 is used to connect CA 12 to wall junction box 18 and the left connector of line cord 14 is plugged into the right receptacle of CA 12. The right connector of line cord 14 (not shown) leads to phone 10, as indicated. In this way CA 12 will be out of sight.

Alternatively, CA 12 may be mounted inside phone 10 (not shown), either as a retrofit or a factory-installed option.

CA 12 has a momentary-contact, pushbutton switch S1. If CA 12 is installed in phone 10, the button of S1 should extend outside of phone 10, e.g., by way of a hole in phone 10.

Operation—FIGS. 1A And 1B

CA 12 functions effectively as follows: It intercepts any ringing signal sent to phone 10 via line cord 14 and provides an alternative signal (usually a song melody) in lieu of the normal phone bell. The alternative signal is selected by the owner or user of phone 10 by using S1. The alternative signal is played by CA 12 for as long as phone 10 rings.

E.g., CA 12 may have a repertiore or "library" of twelve different signal melodies, such as "Happy Birthday", "Fuer Elise", "Clare de Lune", "Jingle Bells", "Stars and Stripes Forever", "Ode To Joy" from Beethoven's Ninth, etc. The user can select a melody according to the season, holiday, or prevalent mood by repeatedly pressing S1 until the desired melody is selected by count according to a prearranged list. If the user has lost track of the currently selected melody, it can be ascertained by having a friend call to activate CA 12.

In this way the prosaic ring of phone 10 will be replaced by a mood or holiday-selectable melody, thereby providing an interesting, amusing, entertaining, novel, and lively effect. The melody may be longer or shorter than each incoming ring cycle (i.e., the time for the ring plus the pause between rings). The melody plays through and repeats, if time allows, until phone 10 is answered. E.g., if the melody selected is "Happy Birthday", and phone 10 is called by another party, in lieu of the normal rings, CA will play the "Happy Birthday" melody until phone 10 is answered.

This effect is espcecially useful at parties. E.g., at a birthday party, incoming calls will be announced by the "Happy Birthday" song, thereby adding to the birthday mood of the party and providing much amusement, joy, and entertainment to the assembled guests. Also, during holidays, such as the Winter Solstice Season, a phone which rang by playing "Jingle Bells" on each ring would add to the mood of the season and provide much amusement, merriment, and joy to a household or business.

In addition to a prerecorded library of melodies, CA 12 may be programmed with selected melodies, or even voiced messages, by the user. E.g., for amusement the user can program CA 12 to verbally state, on each ring, "Pick me up!"

Figure 2:
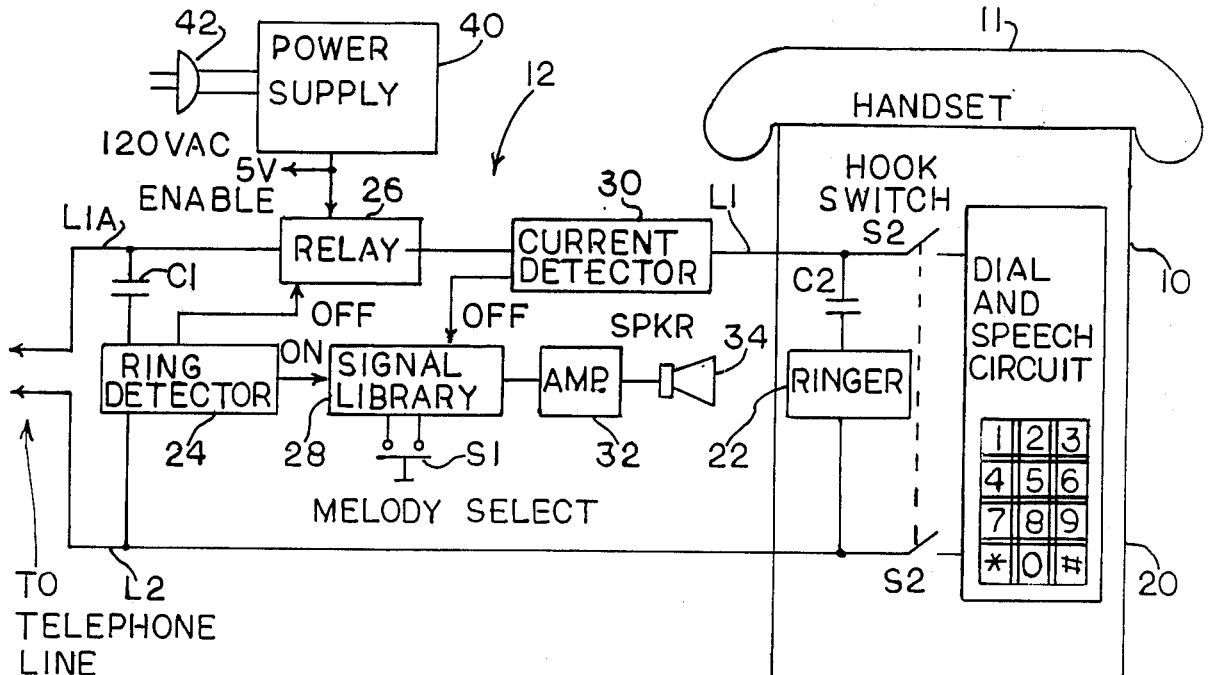
FIG. 2 is a block diagram of the circuit of the CA and a telephone.

Block Diagram Of 12—FIG. 2—Description

FIG. 2 shows a block diagram of the system of FIG. 1A, i.e., the internal components of phone 10 and CA 12. Phone 10 contains conventional dialing and speech circuits, including dial buttons as shown (or a rotary dial—not shown), handset 11, a pair of ganged hook switches S2 which are closed by lifting up handset handset 11, and a conventional bell ringer 22 which is connected in series with a capacitor C2. Phone 10 is connected to two input lines L1 and L2, also known as the ring (red) and tip (green) lines from the customary colors of their wires and their connections to the tip and ring terminals on older, manual switchboard jacks. The circuit with ringer 22 and C2 is always connected across L1 and L2, but dial and speech circuits 20 are connected to L1 and L2 only when S2 is closed by lifting handset 11.

In the prior art, phone 10 operated as follows: When an call came in, a ringing signal appeared across L1 and L2, which lines are them same as line interconnection cord 16 of FIG. 1A. This signal often consisted of approximately two-second bursts of a 20-Hz, 90-Volt AC signal, interspersed by four-second pause intervals. This ringing signal passed through C2 and caused the bells in ringer 22 to ring, two seconds on and four seconds off, until handset handset 11 was lifted. When handset handset 11 was lifted, a direct voltage, which is always present across L1 and L2, caused direct current to pass through circuits 20. The flow of this direct current was sensed by a current sensor at the central office, which stopped the ringing signal, allowing normal two-way speed to take place on L1 and L2.

The remaining components in FIG. 2 constitute CA 12. They comprise a ring detector circuit 24 connected across incoming lines L1A and L2, which are the same as line line cord 14 of FIG. 1A. Ring detector 24 is in series with a capacitor C1. Ring detector 24 comprises a Texas Instruments TCM 1520AC integrated circuit and associated circuitry which is activated by a ringing signal across input lines L1A and L2. In response to each ring burst, ring detector 24 supplies, (a) an OFF signal to a relay 26 during during each burst, and (b) an ON signal to a signal library 28 during and shortly after each burst.

Relay 26 has normally closed contacts, i.e., it is normally conductive, so that it connects L1A to a current detector 30. However during each OFF signal from ring detector 24, the contacts of relay 26 open so that relay 26 become nonconductive to disconnect current detector 30 and phone 10 from L1A. Relay 26 may be a solid-state relay, in which case it will contain a normally conductive transistor which will open when it receives the OFF signal from detector 24. Relay 26 also has an ENABLE input which. When this input is energized with a DC bias voltage, relay 26 will become non-conductive in response to the OFF signal from detector 24. In absence of an ENABLE input, relay 26 will remain conductive even if an OFF signal is supplied thereto from detector 30.

CA 12 is powered by a power supply 40 which converts 120-Volt AC power it receives from plug 42 to 5-Volt DC power (and 3.2 VDC power—not shown) which it supplies to the various components (connections not shown). The 5-Volt supply is also connected to the ENABLE input of relay 26. In lieu of supply 40 and plug 42, energy cells, i.e., a battery, may be used.

Signal library 28 stores, in its internal memory, the group of melodies previously indicated and is able to play the selected melody when it receives the ON signal from ring detector 24. The melody to be played in response to the ON signal is selected by repeatedly pressing S1 (previously described) on signal library 28. In response to an OFF signal from current detector 30, signal library 28 immediately will cease playing the selected melody. The output of signal library 28 is supplied to a amplifier 32, which amplifies it sufficiently to drive a speaker 34.

Current detector 30 is connected between relay 26 and the L1 terminal of phone 10. When it detects the previously mentioned direct current on L1 due to S2 being closed by the lifting of handset 11, it supplies an OFF signal to signal library 28.

FIG. 2—Operation

The circuit of FIG. 2 operates as follows: Assume that no ring signal is coming in on L1A and L2 and handset 11 is on the hook, as indicated. S2 is open so that dial and speech circuits 20 are disconnected from the lines. Relay 26 is conductive so that L1A is connected to L1 via current detector 30. No current flows in this line due to S2 being open; thus current detector 30 does not supply any signal to signal library 28. Since no ring signal is on the line, ring detector 24 is not activated, so it does not activate signal library 28, which is off.

Next assume that a ring signal comes in across lines L1A and L2. This ring signal will be sensed by ring detector 24. In response, detector 24 will provide an ON input to signal library 28 during and for a short time after each ring. Signal library 28 will in turn play the selected melody as long as it receives ON signals from detector 24.

Simultaneously ring detector 24 will supply an OFF signal to relay 26 during each ring. Relay 26, which is enabled by the 5-Volt bias voltage supplied from power suply 40, will thus become intermittently nonconductive in synchronism with the ring bursts in L1A-L2. Thus relay 26 will prevent these bursts from reaching phone 10 and its ringer 22.

If there is a power failure, or if plug 42 becomes disconnected from the 120-Volt power line, the 5-Volt bias to the ENABLE input of relay 26 will terminate and relay 26 will be disabled. If a ring signal should come in on lines L1A-L2 during the power outage, the ring signal will be detected by ring detector 24, which will in turn provide an OFF signal to relay 26. However relay 26 will remain conductive since it is disabled, allowing the ring signal to pass through to ringer 22 of phone 10. Thus the CA will not interfere with normal phone operation even if its power fails.

Assuming the power supply 40 is operating normally, when the user lifts handset 11 to answer the call, S2 will close, allowing direct current to flow through relay 26 and current detector 30 when relay 26 becomes conductive between rings. This direct current will trigger current detector 30, which will supply an OFF signal to signal library 28, thereby terminating the selected melody immediately. Also the direct current will be sensed in the central office, which will terminate the ring signals and allow conversation to occur. The termination of ring signals across L1A and L2 will cause ring detector 24 to cease supplying OFF signals to relay 26, whereupon relay 26 will become continuously conductive.

When the conversation is completed, the user hangs up handset 11, opening S2 and terminating the direct current on the line so that the system is ready for another call.

Figure 3:
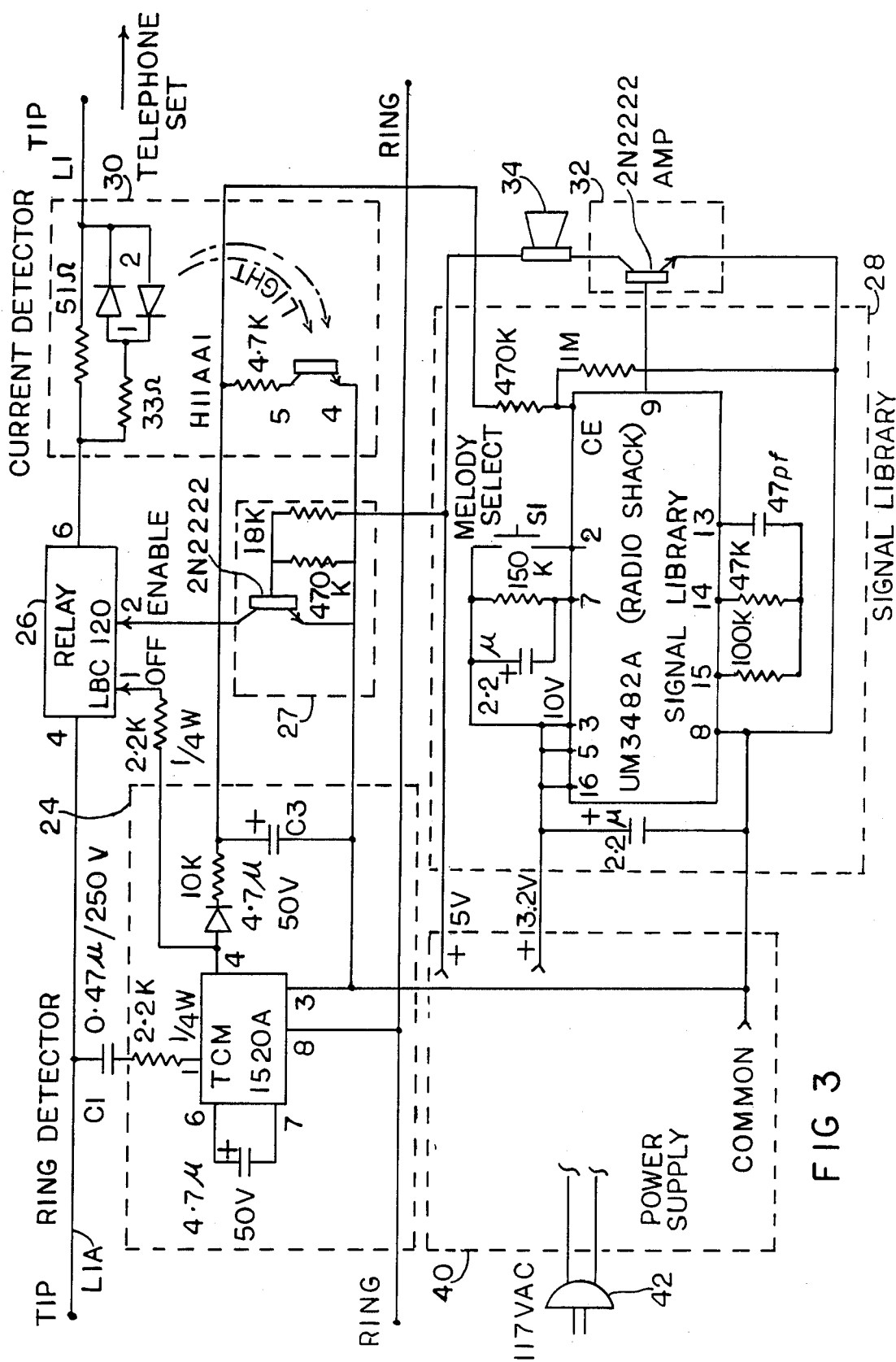
FIG. 3 is a block diagram of the CA and telephone of FIG. 2.

FIG. 3—Schematic Diagram Of FIG. 2 System

FIG. 3 shows a schematic diagram of the FIG. 2 system. Its construction and use will be easily apparent to those skilled in the art given the values and interconnections shown, so it will not be discussed in great detail. Ring detector 24 contains the chip indicated, together with the other components shown which are connected as indicated.

Power supply 40 is conventional; it receives AC power via plug 42 and supplies DC power at the two voltages indicated.

Current detector 30 contains the components shown, including an optical coupler comprising a diode pair light source which illuminates when direct current flows through line L1A to L1; the light is sensed by a pair of light-sensitive transistors which thereupon provide an OFF signal to signal library 28. Signal library 28 contains the chip shown, together with the additional individual components indicated. The output of signal library 28 drives amplifier 32, which uses one transistor, which in turn drives speaker 34.

On each incoming ring, ring detector 24 causes its capacitor C3 to charge, providing a positive voltage to the CE (chip-enable) input of the signal library chip in signal library 28, thereupon starting the playing of the selected melody. This positive voltage persists on C4 between rings, allowing signal library 28 to finish its selected melody. If current detector 30 detects current on L1A-L1, its phototransistors will discharge C3, causing signal library 28 to immediately terminate its melody. Without this immediate turnoff of the melody, it would continue playing for a short time after the called party had picked up the handset, until C3 had discharged slowly, through other circuit components.

Relay 26 is a solid-state relay of the type number indicated. It normally provides a conductive path between its terminals 4 and 6, but becomes nonconductive in response to an OFF input at its terminal 1. It is enabled by grounding its terminal 2; circuit 27 is an inverter which grounds terminal 2 in response to the presence of a 5-Volt output from power supply 40.

Figure 4:
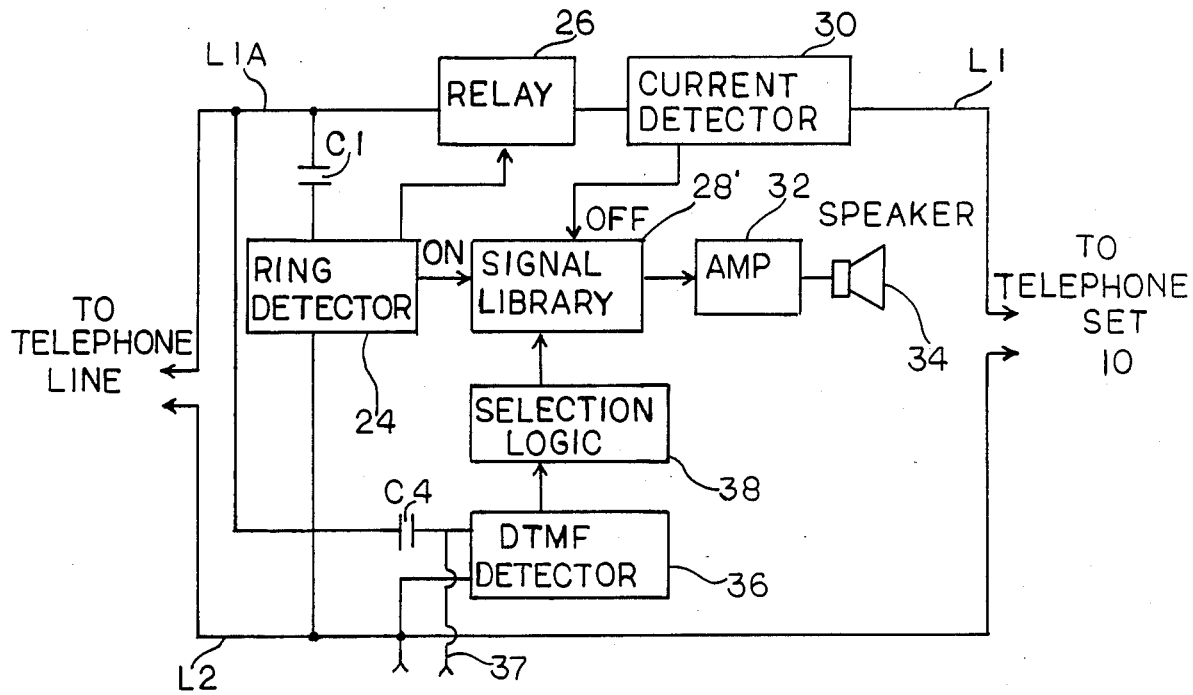
FIG. 4 is a block diagram of the CA with a tone-selectable audible signal.

Caller-Selectable Ring Signal Circuit—FIG. 4

In the circuit of FIG. 4, the caller (as well as the called party) can select the melody or message to be played. Only the circuit of the 12, here designated 12A, is shown; phone 10 is omitted since it is the same as in FIG. 2. Circuit 12A differs from that of FIG. 2 in that it has a DTMF detector 36 (DTMF=Dual-Tone, Multiple Frequency), a selection logic circuit 38, and signal library 28' has a single selection lead, rather than an external switch.

DTMF detector 36 is connected across incoming lines L1A and L2 via a capacitor C4 and functions to receive incoming DTMF signals and convert these to binary form. I.e., a modern pushbutton, tone-generating phone, as illustrated in FIG. 2, generates two simultaneous signals or tones, each of a different frequency, when each button is pushed. Each button, including the pound (#) and asterisk (*) buttons, generate a unique pair of tones, indicative of the symbol on the button that is pushed. In response to each pair of tones supplied to it, DTMF detector 36 supplies a binary output, either in serial or parallel form, to selection logic circuit 38; this binary output is indicative of the symbol on the button. DTMF detector 36 may be a GTE type G8870-1 chip.

In lieu of a caller supplying the DTMF signals on the phone line via an incoming call, the called party can send DTMF tones to directly to DTMF detector 36 on terminals 37 from a local DTMF tone generator or additional tone-generating phone (not shown). In this way the user can select the signal to be played via a numbered keyboard, rather than repeatedly pressing a switch and counting the number of pushes.

Selection logic circuit 38 receives the binary output of DTMF detector 36 and converts this to appropriate switching inputs to signal library 28'. Circuit 38 is connected to signal library 28 by two leads which represent the leads to S1 of FIG. 2. E.g., if a DTMF representing the symbol "7" appears across L1A and L2, DTMF detector 36 will convert this to a binary "7" and circuit 38 will cause signal library 28' to select "Melody 7" in its library.

Figure 5:
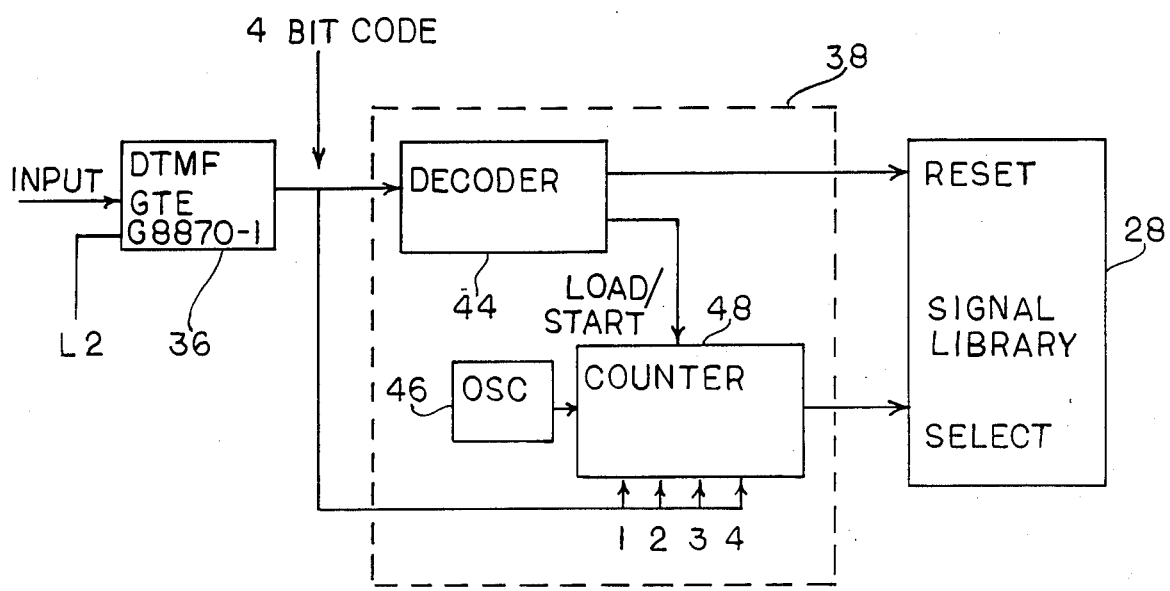
FIG. 5 is a diagram of a selection logic circuit used in FIG. 4.

Circuit 38 also includes a reset/passcode circuit to reset it and tell it to begin its selection process. Preferably this code is the pound symbol (#) followed by the asterisk symbol (*). Selection logic circuit 38 can be arranged to select up to twelve melodies, corresponding to the twelve buttons on a DTMF phone, but can alternatively be arranged to select up to $12 \times 12$ melodies by making it sensitive to two sequential DTMF tones. The components within selection logic circuit 38 are shown in FIG. 5.

The system of FIG. 4 can be set by a remote caller as follows: The caller dials, in the regular fashion, the number of the phone (not shown) which is connected to the output of circuit 12A. Signal library 28' will announce the call with play its previously selected melody in lieu of the normal ring.

To change the selected melody, the caller can, at any time after the conection is made, push the DTMF keys on the caller's phone for the passcode (#, *) and then the number of a selected melody (e.g., "7"). The called party will hear the tones and know the selected melody is being changed, but will not know which new melody is selected.

The caller can also make a surprise change of selection by finishing the conversation, allow the called party to hang up first, and then pushing the DTMF keys. This is possible since the connection will remain briefly if a called party hangs up first.

As a third alternative, if phone 10 is on a private branch exchange (PBX), the main PBX station (usually in the same facility as phone 10) can set signal library 10 at any time using DTMF keys. In either case, this will set signal library 28' to play selected melody "7"on the next call. E.g., if it is the called person's birthday, the caller would select "Happy Birthday" so that when the incoming call would be signalled by playing "Happy Birthday".

FIG. 5—Detail Of Selection Logic

FIG. 5 is a circuit detail showing how to implement selection logic circuit 38 of FIG. 4. Selection logic circuit 38, shown in broken lines in the center of FIG. 5, comprises a decoder 44, a oscillator 46, and a counter 48. Decoder 44 receives a binary reset code from DTMF detector 36 and in response thereto sends a reset signal to signal library 28' and a load/start command to counter 48. (The illustrated reset input line to signal library 28'is omitted from FIG. 4 for purposes of simplification of illustration.) The output of DTMF detector 36, which is a four-bit binary code, is also connected in parallel to four inputs (1 to 4) of counter 48. When a counter 48 receives a load/start command from decoder 44, it loads the binary output from DTMF detector 36. counter 48 includes a memory to store the last two four-bit codes it received from DTMF detector 36. Counter 48 also receives pulses from oscillator 46.

When decoder 44 receives binary pulses from DTMF detector 36, it sends a load/start command to counter 48 which thereupon begins counting down according to the code from DTMF detector 36 and sends its output pulses to signal library 28'. E.g., assume that the pound symbol (#) is a reset signal, the asterisk (*) is a load/-start command, and the single digits 0 to 9 are selection numbers. Thus if a user dialed the four-character sequence "#, *, 1, 2", the "#" would reset signal library 28', the "*" would start counter 48, the "1"would be saved in the memory counter 48, and the "2"would be loaded into counter 48. Counter 48 would then send twelve pulses to signal library 28', thus selecting signal or melody 12.

Figure 6A:
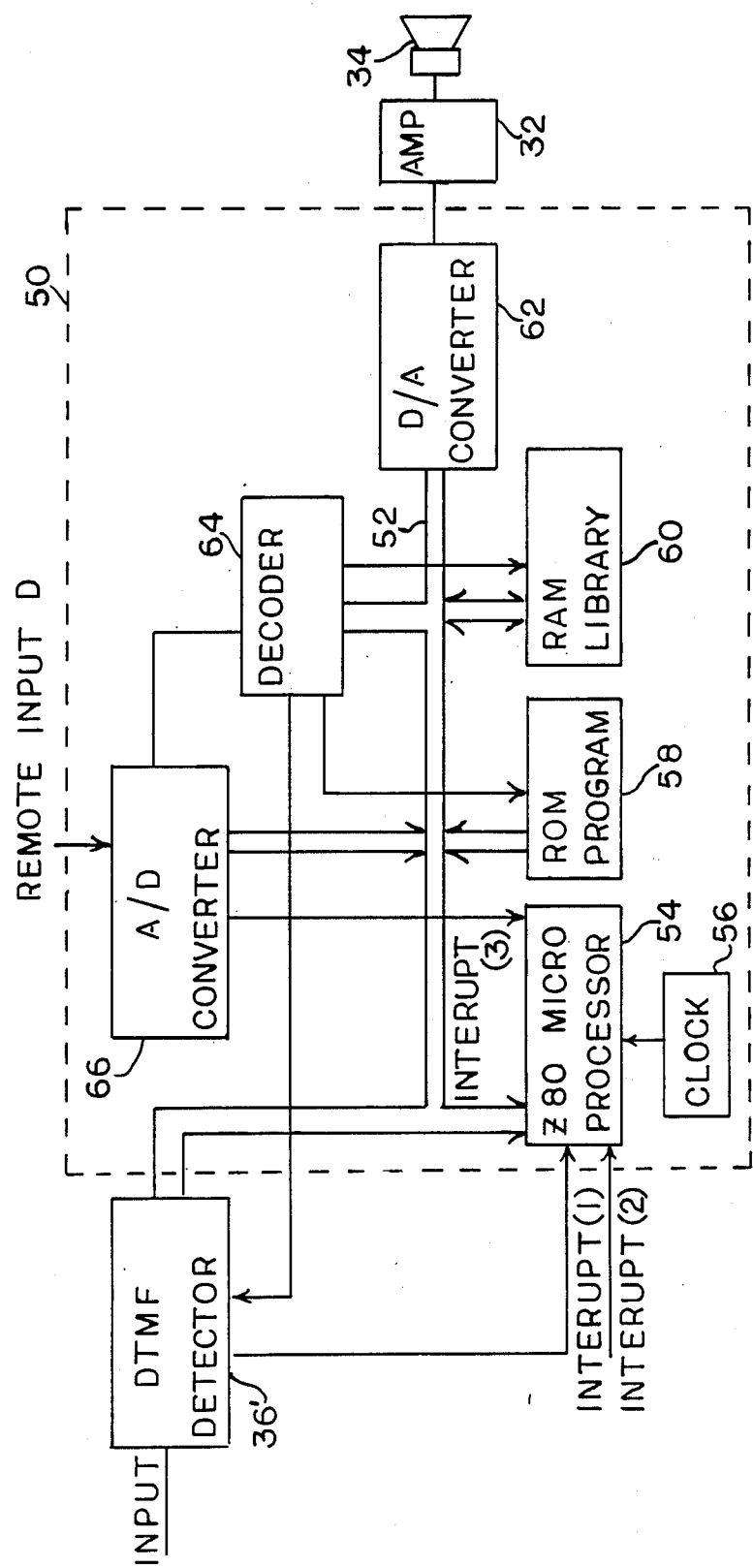
FIG. 6A is a diagram of a microprocessor implementation of the system of FIG. 4.

FIG. 6A—Microprocessor Implementation Of FIG. 4

In lieu of the specialized circuits illustrated in FIG. 4, selection logic circuit 38 and signal library 28' can be implemented in the form of a microprocessor, i.e., a standard integrated circuit chip with standard ancillary components which are programmed like a computer to cause them to function in the same manner as the circuit of FIG. 4. Microprocessor 50 of FIG. 6A provides this function; it comprises a computer data bus 52 connected to DTMF detector 36', chip microprocessor chip 54 (which is in turn clocked by an clock oscillator 56), a program ROM 58 (ROM=Read-Only Memory), a RAM library 60 (RAM=Read-And-write Memory), a output D/A converter 62 (D/A=Digital-to-Analog), a decoder 64, and a remote input D. The foregoing components are also interconnected as shown. The operation of microprocessor 50 is standard and well-known to those skilled in the art and thus will not be detailed here. Note however that microprocessor 50 receives a binary input from DTMF detector 36' on data bus 52. DTMF detector 36' also generates an interrupt signal, Interrupt 1, when its output code is on buss 52 and is ready to be received by the following chip. Detector 36' supplies Interrupt 1 to chip 54 as indicated; this allows chip 54 to receive the code from detector 36' from buss 52.

Remote input D can receive a remote selection audio input from a microphone, tape recorder, telephone, etc. (not shown). A/D converter 66 samples and converts this audio input to binary data and supplies it to chip 54, using another interrupt, Interrupt 3, in the same manner as described with detector 36'.

Chip 54 will direct the binary data to a selected location in RAM library 60 after sampling is completed.

Decoder 64 is an address decoder which serves to decide which block function is to operate since all of the functions are on buss 52 at the same time.

DTMF detector 36 detects the data and supplies a digital code for each analog input it receives.

The melodies or any other selected annunciation output is supplied on buss 52 where it is converted to humanly-sensible signals by output D/A converter 62. The output of output converter 62 is sent to amplifier 32 and thence to speaker 34.

Figure 6B:
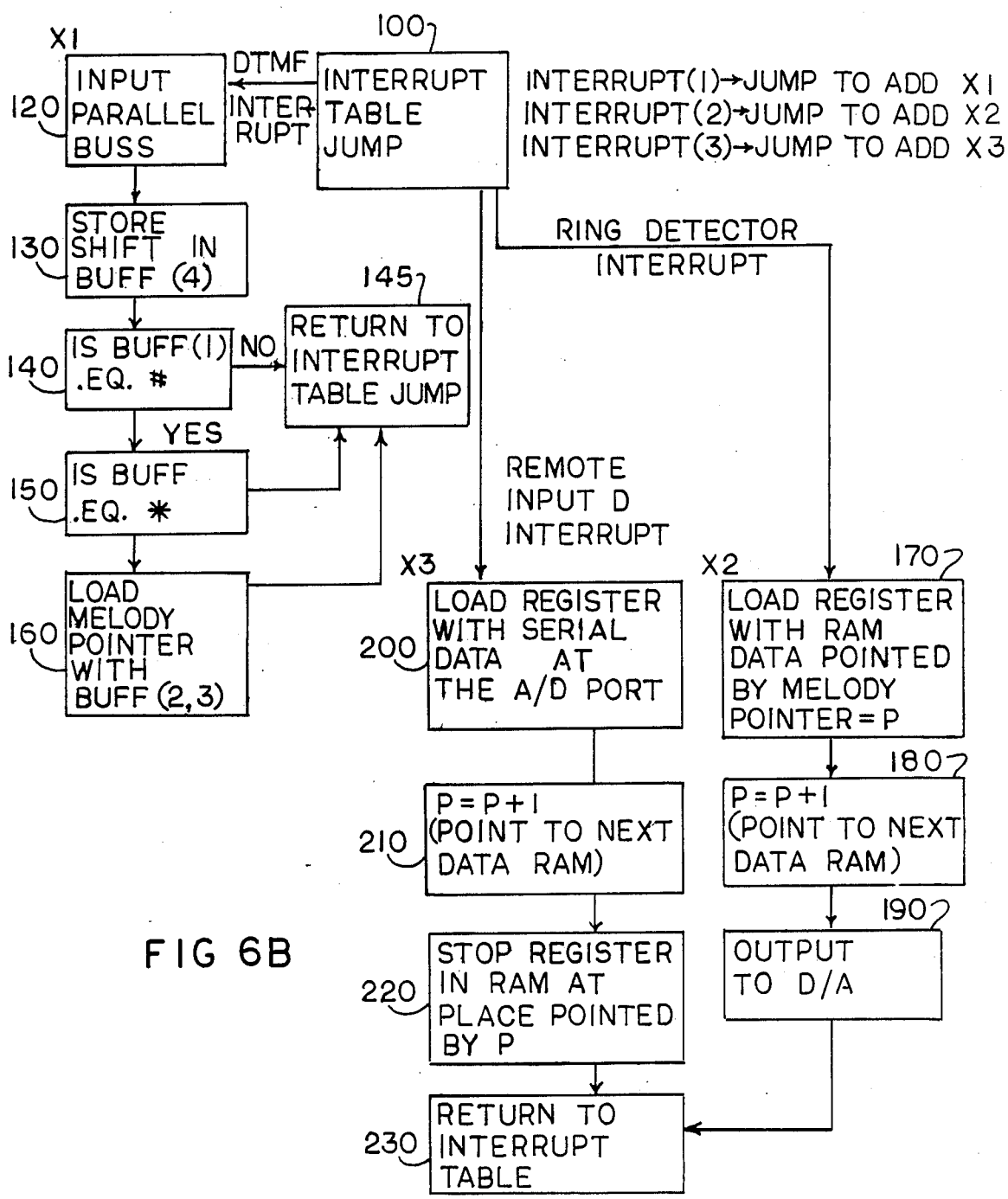
FIG. 6B is a program flowchart for FIG. 6A.

FIG. 6B—ROM Program Flow Chart

The operating program for microprocessor 50 is preprogrammed into program ROM 58 and is diagrammed in FIG. 6B.

The software program uses three interrupts. Interrupt 1 originates in DTMF detector 36'. A second interrupt, Interrupt 2, originates in ring detector 24 (FIG. 4) and Interrupt 3 originates in A/D converter 66 in response to an input from remote input D.

When an interrupt occurs, a program counter in chip 54 jumps to an address according to an interrupt table and then continues processing. This is performed in block 10 of FIG. 6B. For example, Interrupt 1 causes the program to be continued at a preselected address X1, Interrupt 2 at address X2, and Interrupt 3 at address X3.

Decoder 64 determines which of the blocks in FIG. 6A is to be connected to buss 52 since all components have their outputs tied to the buss.

When the DTMF block is being served by chip 54, Interrupt 1 causes the software to be continued at address X1, as indicated by block 120. The input data on the buss, which is the output code from the DTMF receiver, is loaded to a register within the chip 54, and stored in a buffer (Buff 4) that is four memory locations long. The buffer is shifts the data so that it contains the last four inputs from the DTMF receiver.

Then the contents of the buffer are analyzed. If buffer 4 holds the pound character ("#"), then buffer 3 and buffer 2 hold relevant data (flowchart block 140). If the pound sign is not found, then the program returns (block 145) to the interrupt table to await another interrupt.

If the buffer contains relevant data, the melody pointer is loaded with the rest of the buffer's contents. (In the case of a two-digits melody list, the pointer can point to 99 melodies.) The third digit in buffer 1 can be the asterisk ("*") to indicate the end of data. The pointer is loaded with the address in the RAM library where the selected melody is stored. This is done at block 60. When the output is complete, the flowchart logic returns to wait and serve another interrupt.

When the ring detector 24 is being served by chip 54, Interrupt 2 causes the software to continue at address X2 (block 170). The register is loaded with data from the RAM library, as pointed by the the melody pointer, refreshed while serving Interrupt 1. The melody pointer is then incremented by one for the next memory location (block 180). Then the register data is sent to D/A converter 62, to be amplified by amplifier 32 and heard from speaker 34. When the output is complete the logic returns to wait to serve another interrupt (block 230).

The library can be updated or changed through A/D converter 66 and Interrupt 3. The program jumps to address X3 and the A/D digital sampled value of the signal to be stored as library data is sent to the register of chip 54 (block 200). The melody pointer P is incremented by one (block 210), and the register data is stored at the library's RAM at an address equal to the melody pointer (block 220). The melody pointer is incremented with the modulo length of the melody or the message, to make sure that the melody is repetitively played (block 210). When this is complete, the program returns to the interrupt table as before.

Summary, Ramifications, And Scope

Accordingly the reader will see that, according to the invention, I have provided a controllable phone call annunciator which provides a user or caller-selectable ring signal. The signal may be any of a group of melodies suited to a special occasion, mood, etc. Thereby the ordinary, prosaic phone ringer has been replaced by an amusing, exciting, entertaining, and pleasurable annunciator. The system is simple to install, reliable, and economical. It does not interfere with the operation of the normal telephone ringer if its power should be disconnected.

While the above description contains many specificities, these should not be construed as limitations on the scope of the invention, but as exemplifications of the presently-preferred embodiments thereof. Many other ramifications and variations are possible within the teachings to the invention. For example, the system can be built into the phone at the factory, different arrangements can be used for the regular ringer disabling circuit, including simply turning off its bell in a mechanical manner, an off switch can be incorporated to turn the system off in case an ordinary ring is desired, the signals stored in signal library 28 can be partially of all voice messages in lieu of melodies, signal library 28 can be arranged to store a plurality of visual, or combined audio-visual signals and speaker speaker 34 can be replaced or supplemented by a light arrangement, current detector 30 may be omitted, speaker 34 may be a piezoelectric transducer, relay 26 may be replaced by a mechanical relay, the caller may select the signal by alternative means, such as dialing pulses, alternative tones, etc.

Thus the scope of the invention should be determined by the appended claims and their legal equivalents, and not by the examples given.

I claim:

1. A controllable telephone call annunciator, comprising:

signal library means for storing a plurality of different call-announcing signals and supplying, upon activation, a selected one of said signals, output means for receiving the signals supplied by said signal library means and providing a humanly-sensible output in response to each signal, connecting means for connecting said library means and said output means to a telephone containing a ringer, disabling means for disabling said ringer of said telephone and activating said library means in response to a ring signal being received by said telephone, and incoming signal detector means for receiving an incoming signal on a line to said telephone and selecting a particular one of the signals stored in said signal library means in response to said incoming signal.

2. The annunciator of claim 1 wherein said incoming signal detector means comprises a dual-tone, multi-frequency detector for converting said incoming signal to a binary output and a logic circuit for selecting a particular signal in said library means in response to said binary output.

3. The annunciator of claim 1 wherein said signal library means and said incoming signal detector means comprise a microprocessor.

4. The annunciator of claim 1, further including current detector means for detecting a flow of direct current into said telephone and disabling said signal library means in response to said flow of said direct current.

5. The annunciator of claim 1 wherein said signal library means includes a switch for selecting a particular one of the signals stored therein.

6. The annunciator of claim 1 wherein said output means comprises an audible transducer.

7. The annunciator of claim 1 wherein said means for disabling the ringer of said telephone comprises means for opening a line to said telephone in response to a ring signal being received by said telephone.

8. A controllable telephone call annunciator, comprising:

signal library means for storing a plurality of different call-announcing signals and supplying, upon activation, a selected one of said signals, output means for receiving the signals supplied by said signal library means and providing a humanly-sensible output in response to each signal, connecting means for connecting said library means and said output means to a telephone containing a ringer, disabling means for disabling said ringer of said telephone and activating said library means in response to a ring signal being received by said telephone, and means for energizing said annunciator with a direct bias voltage, and enabling means for enabling said disabling means when said direct bias voltage is present and disabling said disabling means when said direct bias voltage is absent, whereby said disabling means will not disable said ringer in the event of a power interruption.

9. A system for providing, to a telephone user, an alternative call-announcing signal in lieu of a telephone ringer, comprising:

ring detection means for detecting an incoming ring signal on a telephone line and providing a predetermined output in response thereto, cutoff means for disabling the ringer of a telephone connected to said line in response to said predetermined output, and signal means providing an alternative call-announcing signal in response to said predetermined output, said signal means being arranged to store a plurality of call-announcing signals in response to said predetermined output, said signal means including selection means for selecting one of said plurality of call-announcing signals, and incoming signal detector means for receiving an incoming signal on a line to said telephone and selecting a particular one of said call-announcing signals stored in said signal means in response to said incoming signal.

10. The system of claim 9 wherein said incoming signal detector means comprises a dual-tone, multi-frequency detector for converting said incoming signal to a binary output and a logic circuit for selecting a particular signal stored in said signal means in response to said binary output.

11. The system of claim 9 wherein said signal means and said incoming signal detector means comprise a microprocessor.

12. The system of claim 9 wherein said selection means comprises a switch for selecting a particular one of the signals stored in said signal means.

13. The system of claim 9 wherein said plurality of different call-announcing signals stored by said signal means represent a plurality of different melodies.

14. The system of claim 9, further including current detector means for detecting a flow of direct current into said telephone and disabling said signal means in response to said flow of direct current.

15. A system for providing, to a telephone user, an alternative call-announcing signal in lieu of a telephone ringer, comprising:

ring detection means for detecting an incoming ring signal on a telephone line and providing a predetermined output in response thereto, cutoff means for disabling the ringer of a telephone connected to said line in response to said predetermined output, and signal means providing an alternative call-announcing signal in response to said predetermined output, an disabling means for disabling said cutoff means in response to an interruption of power to said system, whereby said cutoff means will not disable said ringer in case of a power interruption.

16. The system of claim 15 wherein said means for disabling the ringer of said telephone comprises means for opening a line to said telephone in response to a ring signal being received by said telephone.

17. The system of claim 16 wherein said means for opening said line to said telephone comprises a relay.

* * * * *

UNITED STATES PATENT AND TRADEMARK OFFICE
CERTIFICATE OF CORRECTION

PATENT NO. : 4,856,055

DATED : Aug. 8, 1989

INVENTOR(S) : Nira Schwartz

It is certified that error appears in the above-identified patent and that said Letters Patent is hereby corrected as shown below:

On the title page, item [76], change inventor's address to --2800-187 Plaza Del Amo, Torrance, CA 90503--.

Col. 3, line 66, change "speed" to --speech--.

Col. 4, line 20, delete "which".

Col. 7, line 65, change "chip" to --a--.

Col. 8, line 68, change "two-digits" to --two-digit--.

Claim 9, line 3, combine with line 2 to make lines 1 to 3 a single paragraph.

Claim 15, line 3, combine with line 2 to make lines 1 to 3 a single paragraph.

Signed and Sealed this

Twenty-fourth Day of July, 1990

Attest:

HARRY F. MANBECK, JR.

Attesting Officer

Commissioner of Patents and Trademarks